(12) United States Patent
Craik

(10) Patent No.: US 11,609,752 B2
(45) Date of Patent: *Mar. 21, 2023

(54) LOOP LOCK RESERVATION

(71) Applicant: INTERNATIONAL BUSINESS MACHINES CORPORATION, Armonk, NY (US)

(72) Inventor: Andrew James Craik, North York (CA)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 17/658,848

(22) Filed: Apr. 12, 2022

(65) Prior Publication Data
US 2022/0244928 A1 Aug. 4, 2022

Related U.S. Application Data

(63) Continuation of application No. 16/829,807, filed on Mar. 25, 2020, now Pat. No. 11,334,331.

(51) Int. Cl.
*G06F 8/41* (2018.01)
*G06F 9/52* (2006.01)
(52) U.S. Cl.
CPC ........... *G06F 8/4441* (2013.01); *G06F 8/458* (2013.01); *G06F 9/526* (2013.01)

(58) Field of Classification Search
CPC .... G06F 8/44; G06F 8/443–4443; G06F 8/45; G06F 8/452; G06F 8/458; G06F 8/51; G06F 9/526–528
See application file for complete search history.

(56) References Cited

U.S. PATENT DOCUMENTS

| | | | |
|---|---|---|---|
| 6,735,760 B1 | 5/2004 | Dice | |
| 7,908,256 B2 | 3/2011 | Grcevski | |
| 8,266,607 B2 | 9/2012 | Burka | |
| 9,715,388 B2 | 7/2017 | Chung | |
| 11,334,331 B2 * | 5/2022 | Craik | G06F 9/3851 |
| 11,409,580 B2 * | 8/2022 | Craik | G06F 8/4441 |
| 2008/0250396 A1 | 10/2008 | Grcevski | |
| 2009/0144281 A1 | 6/2009 | Grcevski | |
| 2014/0208085 A1 | 7/2014 | Chung | |
| 2021/0263787 A1 | 8/2021 | Craik | |

OTHER PUBLICATIONS

David, "Continuous and Efficient Lock Profiling for Java on Multicore Architectures," Ph.D. Thesis, Université Pierre et Marie Curie, Mar. 31, 2016, 104 pages. <https://hal.inria.fr/tel-01263203v2/document>.

(Continued)

*Primary Examiner* — Todd Aguilera
(74) *Attorney, Agent, or Firm* — Richard B. Thomas

(57) ABSTRACT

Embodiments relate to a system, program product, and method for implementing loop lock reservations, and, more specifically, for holding a lock reservation across some or all of the iterations of a loop, and under certain conditions, temporarily effect a running thread to yield the reservation and allow other threads to enter the lock.

20 Claims, 12 Drawing Sheets

(56) References Cited

OTHER PUBLICATIONS

Fulton et al., "Compilation Techniques for Real-Time Java Programs", Int'l Symposium on Code Generation and Optimization [online], 2007 [retrieved Jul. 26, 2021], Retrieved from Internet: <URL: https://ieeexplore.ieee.org/stamp/stamp.jsp?arnumber=4145117>, pp. 1-11.

List of IBM Patent Applications Treated as Related, 2 pages Apr. 12, 2022.

Mell et al., "The NIST Definition of Cloud Computing," Recommendations of the National Institute of Standards and Technology, U.S. Department of Commerce, Special Publication 800-145, Sep. 2011, 7 pages.

Pizlo et al., "Fine-grained Adaptive Biased Locking," Proceedings of the 9th International Conference on Principles and Practice of Programming in Java (PPPJ '11), Aug. 24-26, 2011, 11 pages. <https://hosking.github.io/links/Pizlo+2011PPPJ.pdf>.

* cited by examiner

```
401  public class DataOutputStream {
402    ...
403    private OutputStream out;

404    public void writeInt(int v) {
405      out.write(v >>> 24);
406      out.write(v >>> 16);
407      out.write(v >>> 8);
408      out.write(v >>> 0);
409    }
410    ...
411  }

412  public class OutputStream {
413    ...
414    public synchronized void write(int v) { ... }
415    ...
416  }

417  public class Test {
418    protected DataOutputStream out = ...;

419    public void serializeData(int[] data) {
420      for (int idx = 0; idx < data.length; ++idx) {
421        out.writeInt(data[i]);
422      }
423    }
424  }
```

```
501  public void serializeData(int[] data) {
502      for (int idx = 0; idx < data.length; ++idx) {
503          int v = data[idx];
504          out.write(v >>> 24);
505          out.write(v >>> 16);
506          out.write(v >>>  8);
507          out.write(v >>>  0);
508      }
509  }
```

FIG. 5

```
601  public void serializeData(int[] data) {
602      // reserve out's lock
603      for (int idx = 0; idx < data.length; ++idx) {
604          int v = data[idx];
605          out.write(v >>> 24);
606          out.write(v >>> 16);
607          out.write(v >>>  8);
608          out.write(v >>>  0);
609          // we add this if to facilitate cooperative multitasking
610          // if we are not sure the loop will be 'short' running
611          if (idx % release_interval == 0) {
612              // cancel reservation of out's lock
613              // we may call a routine on the VM to yield (eg asynccheck)
614              // reserve out's lock
615          }
616      }
617      // cancel reservation of out's lock
618  }
```

FIG. 6

LOOP LOCK RESERVATION

BACKGROUND

The present disclosure relates to loop lock reservation, and, more specifically, for holding a loop lock reservation across some or all of the iterations of a loop, and under certain conditions, to temporarily effect a running thread to yield the reservation and allow other threads to reserve the lock.

Many known computer systems employ multiple processing devices to perform processing tasks through facilitating the execution of multiple processing threads concurrently to more rapidly execute the instructions of a program. A thread interacts with a target object to facilitate performance of at least a portion of the respective instructions of the associated program. Some of these target objects are shared objects, that is, multiple threads may need to access the shared object. These known computer systems use one or more synchronization schemes to maintain proper processing of parallel threads. One such method for facilitating proper processing of the concurrently-running threads includes implementing a synchronization scheme to prevent simultaneous acquisition of the shared object by multiple threads. At least some known synchronization schemes include a locking mechanism, i.e., locks. These locks enable mutual exclusion of some of the threads with respect to access to a target object resident within the monitor. When multiple threads attempt to acquire a lock, only one of them succeeds, while the rest of the threads are either blocked or suspended. Under certain conditions, a thread may reserve a lock on the target object, where the reservation will need to be cancelled prior to any other threads obtaining a lock on the object.

SUMMARY

A system, computer program product, and method are provided for implementing loop lock reservations, and, more specifically, for holding a loop lock reservation across some or all of the iterations of a loop, and under certain conditions, to temporarily effect a running thread to yield the reservation and allow other threads to reserve the lock.

In one aspect, a computer system is provided for implementing loop lock reservations. The system includes one or more processors defining a multi-threaded processing environment, and one or more memory devices communicatively coupled to the one or more processors. The one or more processors are configured to define a first structure of instructions, The first structure of instructions includes a plurality of successive iterations of first monent-monexit pairs that at least partially define a monent-monexit loop that includes a loop header, loop body, and loop exit that are sequentially coupled. The one or more processors are further configured to determine a value of the plurality of successive iterations of the first monent-monexit pairs exceeds a predetermined threshold. The one or more processors are configured to transform, subject to the determination, the first structure of the instructions to a second structure of instructions. The transformation includes generation of a second monent at the loop header, and generation of a second monexit at the loop exit, The plurality of successive iterations of the first monent-monexit pairs remain unmodified inside the loop body.

In another aspect, a computer program product is provided for implementing loop lock reservations. The computer program product includes one or more computer readable storage media and program instructions collectively stored on the one or more computer-readable storage media. The program instructions include program instructions to define a first structure of instructions. The first structure of instructions includes a plurality of successive iterations of first monent-monexit pairs that at least partially define a monent-monexit loop that includes a loop header, loop body, and loop exit that are sequentially coupled. The program instructions also include program instructions to determine a value of the plurality of successive iterations of the first monent-monexit pairs exceeds a predetermined threshold. The program instructions also include program instructions to transform, subject to the determination, the first structure of the instructions to a second structure of instructions. The transformation includes generation of a second monent at the loop header, and generation of a second monexit at the loop exit. The plurality of successive iterations of the first monent-monexit pairs remain unmodified inside the loop body.

In yet another aspect, a computer-implemented method is provided for implementing loop lock reservations. The method includes defining a first structure of instructions that includes a plurality of successive iterations of first monent-monexit pairs that at least partially define a monent-monexit loop that includes a loop header, loop body, and loop exit that are sequentially coupled. The method also includes determining a value of the plurality of successive iterations of the first monent-monexit pairs exceeds a predetermined threshold. The method further includes, transforming, subject to the determination, the first structure of the instructions to a second structure of instructions. The transformation includes generation of a second monent at the loop header, and generation of a second monexit at the loop exit. The plurality of successive iterations of the first monent-monexit pairs remain unmodified inside the loop body.

The present Summary is not intended to illustrate each aspect of, every implementation of, and/or every embodiment of the present disclosure. These and other features and advantages will become apparent from the following detailed description of the present embodiment(s), taken in conjunction with the accompanying drawings.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are illustrative of certain embodiments and do not limit the disclosure.

FIG. 5 is an illustrative example of code showing the code of FIG. 4 modified to include implementation of a loop lock reservation consistent with the loop lock reservation schematic diagram shown in FIGS. 2 and 3, in accordance with some embodiments of the present disclosure.

FIG. 6 is an illustrative example of code showing the code of FIG. 5 modified to include implementation of cooperative multitasking including an async check consistent with the schematic diagram shown in FIG. 3, in accordance with some embodiments of the present disclosure.

Figure 1:
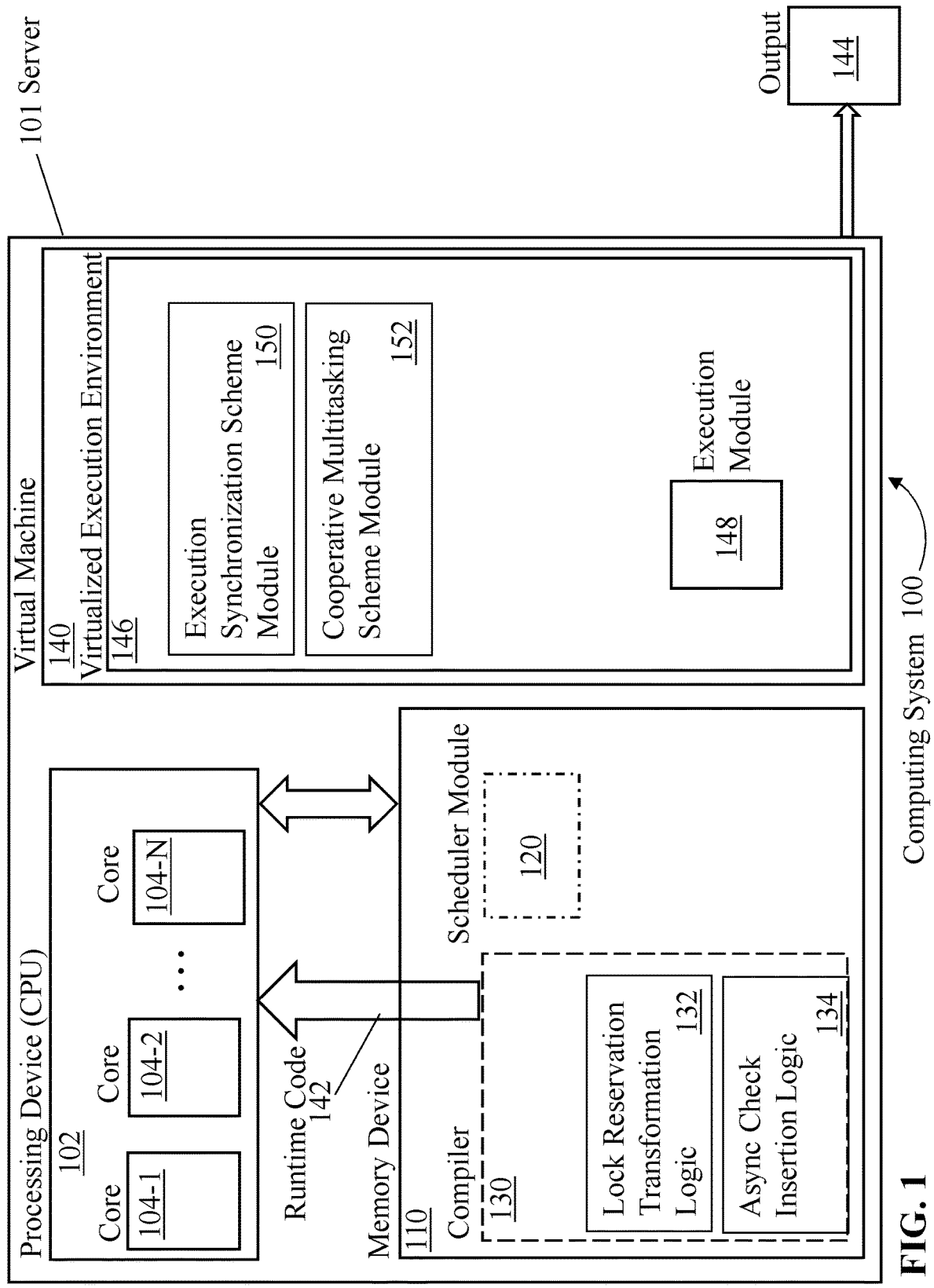
FIG. 1 is a schematic diagram illustrating a computing environment suitable for implementing loop lock reservations, and, more specifically, for holding a lock reservation across some or all of the iterations of a loop, and under certain conditions, to temporarily effect a running thread to yield the reservation and allow other threads to reserve the lock, in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

It will be readily understood that the components of the present embodiments, as generally described and illustrated in the Figures herein, may be arranged and designed in a wide variety of different configurations. Thus, the following details description of the embodiments of the apparatus, system, method, and computer program product of the present embodiments, as presented in the Figures, is not intended to limit the scope of the embodiments, as claimed, but is merely representative of selected embodiments.

Reference throughout this specification to "a select embodiment," "at least one embodiment," "one embodiment," "another embodiment," "other embodiments," or "an embodiment" and similar language means that a particular feature, structure, or characteristic described in connection with the embodiment is included in at least one embodiment. Thus, appearances of the phrases "a select embodiment," "at least one embodiment," "in one embodiment," "another embodiment," "other embodiments," or "an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

Many known computer systems employ multiple processing devices to perform processing tasks through facilitating the execution of multiple processing threads concurrently to more rapidly execute the instructions of a program. Concurrently running threads associated with a particular process are typically orchestrated through an operating system scheduler. Threads interact with target objects resident in the computer's shared memory system which may be concurrently accessed by other threads. Access coordination is performed using a monitor to sequence operations between the threads. As such, the instructions to read/write part of the objects' state are protected with a monitor to sequence the operation relative to the operations other threads want to perform on the same object. to facilitate performance of the respective instructions of the associated program. The target object is typically either data required by the program or is a software-based entity including executable instructions. The target object has a defined state that is represented by attributes and properties of the target object. Some of these target objects are shared objects, that is, multiple threads may need to access the shared object. Accordingly, a synchronization scheme is necessary to prevent simultaneous acquisition of the shared object by multiple threads. When multiple threads attempt to acquire a lock, only one of them succeeds, while the rest of the threads are either blocked or suspended. For example, if two threads try to update a value of the target object at the same time without synchronization, i.e., a data race, lost updates may result. Further, the value being updated could be corrupted.

These known computer systems use one or more synchronization schemes to maintain proper processing of parallel threads with a deterministic approach to manage the spectrum of possible program states. One such method for facilitating proper processing of the concurrently-running threads is to implement a synchronization scheme that defines a cooperative threading model that includes a locking mechanism, i.e., one or more locks on selected resources. Accordingly, these locks enable mutual exclusion of the threads with respect to access to a target resource.

Such mutual exclusion is achieved from monitor entry (monent) through monitor exit (monexit). At least one coherent scheme is used to permit access to the shared object by only one thread at a time, such that the shared object is locked at monent for the acquiring the thread to perform certain operations that are dependent on the target object being in a locked state. One of the most challenging aspects of the aforementioned synchronization scheme is the implementation of the aforementioned mutual exclusion, e.g., the implementation of the lock acquisition (i.e., monent operation) and lock release (i.e., monexit operation). Each of lock acquisition and lock release is an atomic operation, i.e., an operation which is performed as a single unit of work without the possibility of interference from other operations. Acquiring a lock is a relatively expensive operation due to the use of special processor instructions, often referred to as barrier code or barrier instructions, to atomically set values in memory or to make writes visible to other CPUs. One method of optimization of the locks includes reducing the cost of acquiring the locks through eliminating redundant locks at compile-time. However, the redundancies should be removed without eliminating nonredundant locks, such elimination thereby being conservative with an associated limited positive effect. The analyses required to prove the correctness of lock elimination are technically complex, computationally expensive and, as noted previously, necessarily conservative to preserve the program execution semantics. Accordingly, at least some known mechanisms for increasing the efficiency of thread lock management provide limited improvements in efficiency.

Another optimization technique includes lock reservation that facilitates reducing the cost of lock acquisition and release by assuming a given lock is only ever acquired by a single thread, rather than a plurality of threads. In general, this situation is not uncommon in large software systems where component libraries are written using locks to make them safe to use in parallel execution systems but are then employed in ways where concurrent access is very rarely encountered. As previously described, without any lock reservation mechanism, each lock acquisition and release operation must execute expensive barrier code in case another thread could be trying to acquire the lock. Execution of repeated and redundant atomic operations will likely reduce the performance efficiency of the associated computing system. In lock reservation, when a thread first acquires a lock it marks the lock as reserved for its use. Subsequent lock acquisition and release operations no longer require including the execution of expensive barrier code, thereby providing a significant performance improvement. However, once a lock is reserved, no other thread can acquire the lock without the reserving thread explicitly unreserving its reservation. This process is referred to as a reservation cancellation. Therefore, under such an optimization technique, the monent operations include acquisition and reservation of a lock and the monexit operations include release and unreservation of the lock. Notably, in some cases, a lock may be reserved for a thread, but not necessarily acquired by the thread. For example, a lock reservation by one thread may be released by that thread. Similarly, in some cases, a lock may be acquired by a thread, but the lock may not be reserved for that particular thread. For example, a first thread may have unreserved the lock such that a second thread may reserve the thread. Accordingly, lock reservation can be extremely beneficial, but may also negatively impact performance depending on the patterns of lock acquisition and release employed by the program at execution time.

Such relatively simple lock reservation, typically referred to as biased locking, is a lock optimization scheme that is beneficial when the far majority of the locks are normally only taken by a single thread. This pattern of single threaded locking, i.e., biased locking, often occurs in programs where synchronized methods require mutual exclusion for the code, but, many of the objects using synchronized methods are typically only ever accessed by a single thread. Such biased locking makes it relatively inexpensive for a thread to repeatedly acquire a given lock, but at the cost of making it much more expensive for another thread to acquire the lock.

However, for those programs that use a certain number of shared objects, the use of such shared objects eventually results in one or more additional threads, in addition to the thread that currently has a lock reservation directed toward the object, needing to access the shared object. While such lock reservation has been shown to improve performance in many real-world programs, it must, however, and in general, be used sparingly since it is a global, i.e., system-wide lock state optimization. Specifically, objects participating in reservations can originate anywhere in the system, and since reservation is generally done based on object type, it is a very coarse-grained optimization tool with potential to reduce performance as well as to increase it.

Prior to an additional thread acquiring the shared object with a lock reservation through a new lock, the existing lock reservation needs to be released, or cancelled. While lock reservation typically improves lock acquisition operations at monent and lock release operations at monexit for the affected threads, cancellation of the lock reservation is also generally an expensive operation in terms of execution time. Specifically, the acquisition of a reserved lock by another thread is known as a reservation cancellation and generally requires the thread requesting the cancellation to stop executing until the presently reserving thread has unlocked the shared object and halted execution to allow for the lock reservation of the shared object to be transferred from the original reserving thread to the new thread. Accordingly, use of a lock reservation synchronization scheme requires carefully tuned heuristics to provide a net performance improvement.

The benefit from the improved lock reservation scheme may be most substantial if the code guarded by monitor primitives, i.e., the monent operations and monexit operations, is short running. In such a case, the overhead of memory coherency protocol instructions no longer dominates the performance of the code, i.e., once a shared object is reserved, the reserving thread can enter and exit the synchronized region of code without requiring execution of the expensive memory coherency protocol instructions. While global reservation my not be the most beneficial device, reservation over such short code sequences protected by monitor primitives can provide a performance benefit. Accordingly, to avoid excessive cancellations, selective use of lock reservation can be applied, for short-running synchronized code, where the potential for cancellations of reservations is relatively small, the costs of memory coherency protocol instructions are relatively large, and the primary costs of performance are due to the monitor primitives.

At least some known previous efforts on lock reservation have focused on optimization of sequentially adjacent short-running code sequences where localized reservation can provide performance benefits as previously discussed. They, however, do not consider semantically, rather than sequentially, adjacent short running code sequences, e.g., short code sequences protected by monitor primitives in loops. Specifically, when the loop runs, a significant proportion of its execution cost will be attributed to the time taken to run monitor primitives, thereby exacerbating the cost of these expensive instructions.

As discussed herein, repeated acquisition of a lock by a thread incurs an execution cost that typically slows down the execution of the associated program within the associated computer system. The execution of loops within such a configuration exacerbates the execution cost of acquiring and releasing the lock. Typically, a critical section of the code of a program, a code sequence protected by monitor primitives, is found in a loop and execution of the loop requires repeatedly locking and unlocking the target object, where these repeated operations use the same barrier code over and over, thereby slowing the processing of other threads.

A system, computer program product, and method are disclosed and described herein for mitigating the negative effects of processing loops containing critical code sections in a multi-threaded computing system. In at least one embodiment, two additional loop lock operations are created. The algorithm described herein detects a set of successive iterations of monent and monexit operations pairs that define a lock structure, i.e., a pair of lock acquire and lock release operations, that is desired to be transformed through the process described herein.

In at least one embodiment, a transformation of the existing lock structure is implemented, where a monent (reserve only) operation is created and a monexit (unreserve only) operation is created, thereby defining a loop-scoped lock reservation. The monent (reserve only) operation is configured to reserve the lock to the current thread without an acquisition of the lock, if the lock is free and not reserved. Such transformation only reserves the lock for the present thread for the short term and only across the present loop to be optimized. Also, such transformation allows the thread to run without interference from another thread and therefore not establish a global lock reservation for the thread through an acquisition of the lock. The monent (reserve only) operations are contrasted with the monent operations discussed herein, where the monent instructions include both acquisition and reservation, while the monent (reserve only) operations reserve the lock without lock acquisition.

Similarly, the monexit (unreserve only) operation, added after the loop execution has completed, is configured to unreserve the lock from the present thread once the thread has completed the associated execution, thereby freeing the lock such that the lock is again free to other threads. The monexit (unreserve only) operations are contrasted with the monexit instructions discussed herein, where the monexit instructions release a lock without affecting the lock's reservation status, while the monexit (unreserve only) instructions unreserve the lock without affecting the lock's acquisition status. Specifically, the transformations made by embodiments disclosed herein ensure lock is reserved for the thread before execution of the loop is initiated and the lock reservation will be cancelled once the loop concludes execution. The creation and placement of the monent (reserve only) and the monexit (unreserve only) operations are compile-time transformations of the lock structure. The subsequent lock reservation behavior associated with the loop occurs at run-time. Implementation of a monent (reserve only) and monexit (unreserve only) operations pair results in a local unreservation of the lock by the current thread (a form of cooperative multitasking) rather than a true cancellation which requires the thread wanting to acquire the lock blocking until the thread with the reservation stops execution with the lock not held so that the reservation can be cancelled. At least partially due to the elimination of unnecessary atomic instructions, the execution of the local cancellation is much less expensive with respect to system execution than the global cancellation. Accordingly, an existing loop is transformed to have a loop-scoped lock reservation.

The monent (reserve only) and monexit (unreserve only) operations do not exist in the loop at the point where the algorithm detects the successive iterations and monent-monexit operations pairs to identify the proximity of the lock structure to transform. The monent (reserve only) operation is added in the loop header and the monexit (unreserve only) operation is added ahead of the code sequences to be run when the loop terminates, i.e., both the monent (reserve only) and the monexit (unreserve only) are created outside of the loop body. The original monent and monexit operations remain unmodified inside the loop body, where the newly added monent (reserve only) and monexit (unreserve only) operations are additional lock operations added to the original lock operations. Accordingly, the transformation to create a loop lock reservation is a compile-time event.

To facilitate the system properly managing the synchronization policies, a mechanism is used for accurate tracking of the number of iterations of the loop being completed, generally known as a loop trip count, while the lock reservation is maintained. In loops with an existing primary induction variable, the loop trip count can be derived from the value of the primary induction variable. For uncounted loops, a counter is inserted to maintain the loop trip count.

In at least some embodiments, the duration of the loops' execution may be sufficiently long that the probability of other threads needing to cancel the present thread's lock reservation to allow another thread to access to the shared object. Specifically, the sequence of instructions generated by the compiler at compile-time will be executed at run-time. As such, there would be no opportunity for the run-time system to yield the execution of the thread, and there are no mechanisms for the thread to yield control to any other threads. Examples of other threads that may need long-running loops to yield include run-time activities such as, and without limitation, garbage collection and safety checks, portions of the interpreter, and virtual machine activities, such as, without limitation, memory cleanup for reallocation. For long running loops, holding a reservation over the entire execution time of the loop will increase the probability of contention on the lock being reserved. Such contention would cause the code to be much less performant than anticipated for the program due to the delay of the other activities waiting to acquire the lock. In addition, the code will also be less performant due to the subsequent delay of reacquisition of the lock by the running thread due to the extended backup of the other activities vying for control of the lock. In addition, reluctance of the running thread to relinquish the lock reservation will tend to create false contention, i.e., threads block waiting for the reserved lock when without reservation the repeated acquire-release of the lock would allow other threads to acquire the lock and progress their own execution without affecting the thread executing the loop).

Mitigation of this false contention is achieved by periodically releasing the lock reservation of the presently running threads to allow other threads to acquire the lock. Therefore, features as described herein include periodic checks by the system to determine if the aforementioned activities are due, or overdue, and will provide opportunities for the active thread to yield the lock reservation temporarily to allow other threads to acquire the lock and continue their own execution. Such periodic checks are referred to herein as "async check" features. In at least one embodiment, the periodicity of the async checks may be determined through observation of the other run-time activities such that an asynchronous operation may not be necessary after every execution of the loop. Rather, the async check can be implemented to perform the checks with sufficient periodicity to ensure the other run-time activities are sufficiently managed, thereby facilitating cooperative multitasking, sometimes referred to as cooperative threading.

For example, in at least one embodiment, for loops that are typically not counted, a loop counter could be introduced. A predetermined number of iterations of the loops (e.g., X iterations) may be permitted to run, and the loop reservation may be yielded to perform the async check. In at least one embodiment, the system counts the number of successive iterations of the monent-monexit operations pairs, and once the value of the successive iterations of the loop exceeds a predetermined threshold value, the existing loop reservation is yielded for the async check. While there is a small execution cost to the temporary release of the loop reservation and reacquisition, the overall benefit of this scheme includes X−1 cycles of the loop reservation not required to be performed. When the reservation is released, the current thread yields and, once selected to run again, will re-acquire the lock reservation before continuing execution.

Upon being selected to run again, the affected thread that released the lock reservation will reacquire the reservation, thereby preserving the performance benefit of reducing the number of atomic operations required by each iteration of the loop as it acquires and releases the reservation. The monent-monexit operations pair counter will be reset to zero to restart the count. Therefore, only one cycle of loop reservation and cancellation is required rather than repeated loop iteration cycles, thereby mitigating the synchronization costs through avoiding a significant change in the behavior of the threads in the system. As described herein, the async check is embodied in a just-in-time compilation to generate the yielding of the loop reservation by the thread and the subsequent reacquisition. Any loop whose execution is not determined by analysis at compile-time to run sufficiently few iterations to not require an async check will have an async check added to the loop. Accordingly, the compiler-generated async check in a loop transformed to have a loop-scoped lock reservation enhances the features as described herein to facilitate the active thread running the loop yielding the lock reservation.

Also, for example, in at least one embodiment, for a counted loop, the loop primary induction variable (a variable that increases or decreases by a fixed amount through every iteration of the loop) modulo (division remainder) is tested for zero, thereby indicating the need to yield control and to run the async check. Under the circumstances where the outcome indicates "true", a monexit (unreserve only) operation for each lock reserved across the loop, followed by a lock reservation. In some embodiments, the attainment of the lock reservation may be subject to a delay of a scheduler yield to provide other threads the opportunity to acquire the lock while the reservation is released. Regardless of the loop counting mechanism, the cooperative multitasking features are further enhanced with automation of the async features as described herein. Accordingly, in order to reduce the risk of false contention, the lock reservation by the present thread will be released prior to the yield in the async check and is reacquired once the async check is completed.

Referring to FIG. 1, a schematic diagram is provided illustrating a computing environment, i.e., a computing system 100 suitable for implementing loop lock reservations, and, more specifically, for holding a lock reservation across some or all of the iterations of a loop. Under certain conditions, the computer system 100 is suitable to temporarily effect a running thread to yield the reservation and allow other threads to acquire the lock. The computing system 100 includes a server 101. The server 101 includes one or more processing devices 102, sometimes referred to as central processing units (CPUs), where, in the exemplary embodiment, one multi-core processing device 102 is shown. Each multi-core processing device 102 includes two or more cores 104, including, in the exemplary embodiment, a first core 104-1, a second core 104-2, and an $N^{th}$ core 104-N, where N can be any integer that enables operation of the multi-core processing devices 102 and the computing system 100. In at least one embodiment, the server 101 includes a plurality of processing devices that are not multi-core processing devices and each such processing device includes one core. Accordingly, the one or more processing devices 102 define a multi-threaded processing environment.

The server 101 also includes one or more memory devices 110 that are communicatively and operably coupled to the processing device 102, where one memory device 110 is shown in FIG. 1. In at least some embodiments, the memory device 110 includes a scheduler module 120 resident therein. In at least one embodiment, the scheduler module 120 is embedded within one or more operating systems (not shown) resident within the server 101. In some embodiments, the scheduler module 120 is a stand-alone feature. The scheduler module 120 is configured to schedule at least a portion of the processing tasks (discussed further herein) for execution.

In at least some embodiments, the memory device 110 also includes a compiler 130 resident within the memory device 110. The compiler 130 is configured to run lock reservation transformation logic 132 and async check insertion logic 134. The compiled lock reservation transformation logic 132 and async check insertion logic 134 are described further herein.

The server 101 also includes a virtual machine 140 to execute runtime code 142 from the memory device 110, or the processing device 102, to generate an output 144. The lock reservation transformation logic 132 and the async check insertion logic 134 are applied to an input program (not shown) that is fed to the compiler 130 and the lock reservation transformation logic 132 and the async check insertion logic 134 transform that program, where the result of such transformation is present within the runtime code 142. The virtual machine 140 includes a virtualized execution environment 146 that includes an execution module 148 configured to execute the code fed as input to the compiler 130. In at least one embodiment, the virtualized execution environment 146 includes an execution synchronization scheme module 150 and a cooperative multitasking scheme module 152. In at least some embodiments, execution synchronization scheme module 150 is configured to facilitate one or more synchronization schemes to maintain proper processing of parallel threads. One such method for facilitating proper processing of the concurrently-running threads includes implementing a synchronization scheme to prevent simultaneous acquisition of the shared object by multiple threads. At least some known synchronization schemes include a locking mechanism, i.e., locks. The cooperative multitasking scheme module 152 and associated functionality are discussed further herein. Accordingly, the computing system 100 includes a compiler 130 and a virtualized execution environment 146 to provide the functionality necessary to implement at least a portion of the features as described herein at compile-time and runtime, respectively.

Figure 2:
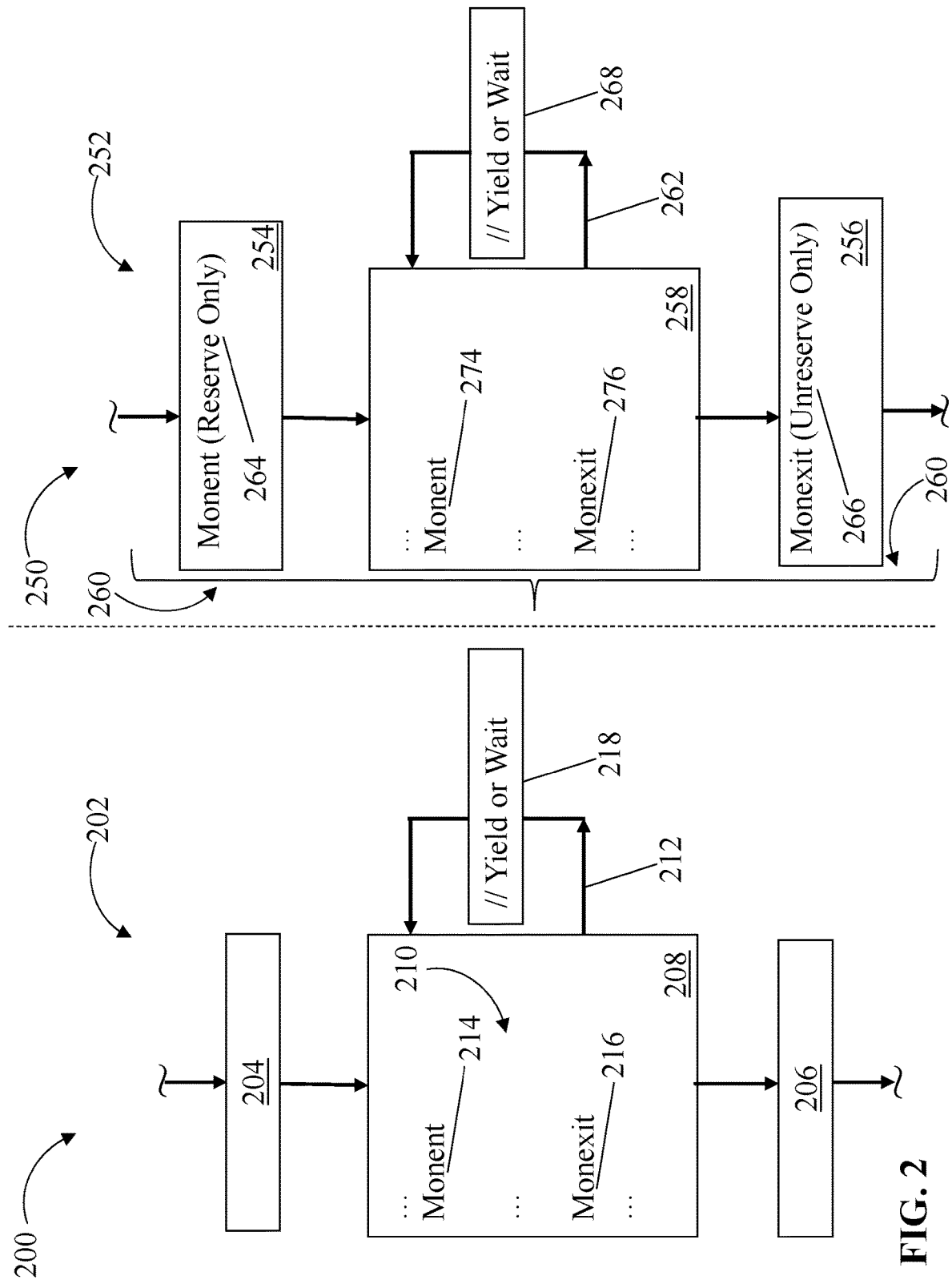
FIG. 2 is a schematic diagram illustrating a portion of a program with a transformation of a lock reservation to show implementation of a loop lock reservation, in accordance with some embodiments of the present disclosure.

Referring to FIG. 2, a schematic diagram is provided illustrating a portion 202 of a program 200 prior to modification, and a portion 252 of the program 250 with a transformation of a lock reservation to show implementation of a loop lock reservation. The portion 202 of the program 200 has a first structure that includes a loop header 204 and a loop exit 206. In the embodiment shown, the loop header 204 and the loop exit 206 are unpopulated. The portion 202 of the program 200 also includes a loop body 208 that includes the code necessary to perform a sequence of one or more lock acquire and release operations 210 that are used to execute an iterative loop 212. In at least some embodiments, the lock acquire and release operations 210 are implemented and/or controlled by the execution synchronization scheme module 150. The iterative loop 212 is any iterative process that enables operation of the portion 202 of the program 200 as described herein. The lock acquire and release operations 210 include a plurality of monitor entry (monent) operations 214 and an equal number of monitor exit (monexit) operations 216, where the lock acquire and release operations 210 cause a lock to be acquired and released on iterations of the loop 208 by the monent 214 and monexit 216 operations.

The iterative loop 212 includes an async check operation 218 that enables, for example, and without limitation, the virtual machine 140 to perform other activities that are required to be performed on a periodic frequency. The async check operation 218 will direct the active thread executing the loop 212 to yield and direct the thread to allow one or more other threads to run, such as, and without limitation, garbage collection and safety checks. Accordingly, the portion 202 includes a first structure of the program 200, where the portion 202 includes a loop 212 that incurs the associated execution costs of the lock acquire and release operations 210 as described herein.

Continuing to refer to FIG. 2, the portion 252 of the program 250 is shown, where the program 250 and the associated portion 252 represent the program 200 and the associated portion 202, respectively A monent (reserve only) operation 264 is added at the end of loop header block 204 to produce the new loop header block 254. Similarly, a monexit (unreserve only) operation 266 is added to the loop exit block 206 to produce the new loop exit block 256. The monent (reserve only) operation 264 and the monexit (unreserve only) operation 266 cooperate to implement a loop-scoped lock reservation 260 possibly through runtime calls to the execution synchronization scheme module 150. Referring to FIGS. 1 and 2, the monent (reserve only) operation 264 and the monexit (unreserve only) operation 266 is created through the lock reservation transformation logic 132 executed by the compiler 130, the lock acquire and release operations 210 are embedded in runtime code 142 and may make use of synchronization module 150 to help implement the lock acquire and release operations 210. The loop-scoped lock reservation 260 extends across the entire loop 262, as well as the monent (reserve only) operation 264 and the monexit (unreserve only) operation 266.

The reserving monent (reserve only) operation 264 and the monexit (unreserve only) operation 266 do not exist in the loop at the point where the associated loop lock reservation algorithm, through the lock reservation transformation logic 132, detects the successive iterations of the monent 274-monexit 276 operations pairs prior to the lock reservation transformation. The subsequent transformation, through the lock reservation transformation logic 132, includes the monent (reserve only) operations 264 being added at the loop header 254 of the loop 262 and the monexit (unreserve only) operation 266 being added at the loop exit 256, i.e., outside of the loop body 258. The original monent operations 274 and monexit operations 276 remain unmodified inside the loop body 258.

Therefore, the monent (reserve only) operation 264 is configured to, reserve the lock to the current thread. Similarly, the monexit (unreserve only) operation 266 of the loop 262 is configured to unreserve the lock from the current thread. In at least one embodiment, and as discussed further herein, the lock is released prior to completing execution of the loop 262 in a manner such that interference with other threads and functions is mitigated (as discussed further herein). Specifically, the lock is reserved for the thread before execution of the loop 262 is initiated through the loop-scoped lock reservation 260 and the lock may be unreserved once the loop 262 process, or processes, are executed. The creation and placement of the reserving monent (reserve only) operation 264 and the monexit (unreserve only) operation 266 are compile-time transformations of the loop 208, with lock acquire and release operations 210, to the structure of the loop-scoped lock reservation 260. The subsequent lock reservation behavior associated with the loop-scoped lock reservation 260 occurs at run-time. The loop 262 includes the async check operation 268.

Accordingly, the transformation of the first structure in the portion 202 to the second structure in the portion 252 creates a reserving monent operation 264 and a reserve only monexit operation 266 outside of the loop body 258 where the monent 274-monexit 276 operations pairs execute during the iterative portions of the loop 262.

In at least one embodiment, and in general, the code to be executed within a loop is a relatively simple process with a straight-line path through the loop, i.e., the sequential steps of the process are directly successive and there are no paths for other features. However, those loops with multiple, potentially divergent paths can be treated differently. For example, a simple loop may be stated as:

```
while (condition) {
monent
...
monexit
}
``` where there is only one path through the subject loop. The loop reservation may be held from the monent to the monexit and released at the monexit.

In the event that it is determined that holding the reservation while running multiple, iterative cycles of the loop is beneficial from the perspective of reducing, or eliminating unnecessary atomic operations, the loop may be transformed to add a loop lock reservation:

```
monent reserve only
while (condition) {
monent
...
monexit
monexit unreserve only
``` where the monent (reserve only) and monexit (unreserve only) are positioned immediately preceding the loop instructions and immediately after the loop instructions, and there is only one path through the subject loop. The loop reservation may be held from the monent (reserve only) to the monexit (unreserve only) instructions and released at the monexit (unreserve only) instructions.

When the loop body contains conditional control flow, it may be beneficial to hold the lock reservation on all paths through the loop or, equally, it may only be beneficial to hold the lock reservation on a subset of paths through the loop. Consider a loop with an error check, where it would normally be assumed that the error check would not fail at runtime. If the error check were to fail, a sequence of compensation/error handling logic might run and this logic may either not benefit from the lock reservation or, worse, increase the potential for false contention with other threads if the reservation is held while it runs. Therefore, also as discussed elsewhere herein, a loop lock reservation is attained for the straight-line path case and, potentially, unreserved or unreserved and re-reserved for the error handling path which is unlikely to execute.

In some embodiments, a more complicated loop may be present, where there are one or more alternative paths that could be taken. An example of such a loop is:

```
while (condition) {
    if (condition 2) {
        monent
        ...
        monexit
    } else {
        call function
    }
}
```

Such a lock reservation may be transformed to:

```
monent reserve only
while (condition) {
    if (condition 2) {
        monent
        ...
        monexit
    } else {
        call function
    }
monexit unreserve only
``` where there exists actual knowledge that the function is rarely, if ever, called, and, if a reservation cancellation is ever required, the overall costs of execution can tolerate the occasional reservation cancellation.

However, under other circumstances, at least a portion of the operations associated with the various call functions may not be fully known or understood and the potential for a larger number of expensive reservation cancellations, i.e., false contention, is greater. Therefore, in order to not have the present thread hold on to the reservation during the execution of the call function, the conditional loop reservation may be transformed to:

```
monent reserve only
while (condition) {
    if (condition 2) {
        monent
        ...
        monexit
    } else {
        monexit unreserve only
        call function
    }
monexit unreserve only
``` where a monexit (unreserve only) instruction is positioned before the "call function" instruction. This resulting structure will cause the release of the reservation to the present thread and the remainder of the loop will run without the reservation. The additional one or more reserve only monexits are positioned on control flow paths leaving the linear sequence of associated locks subject to reservation. Accordingly, coding a reserve only monexit instruction on each of the selected departure paths will facilitate ending the reservation without a cancellation at the cost of a single atomic operation for each path, which is much less expensive with respect to system performance than a lock cancellation.

An alternative code structure to the previous embodiment is:

```
monent reserve only
while (condition) {
    if (condition 2) {
        monent
        ...
        monexit
    } else {
        monexit unreserve only
        call function
        monent reserve only
    }
monexit unreserve only
``` where, after the "call function" instruction, the reservation is restored with the knowledge that the call function will rarely, if ever, be executed.

The additional monexits (unreserve only) do not affect any previously existing monexits (unreserve only) within the code, where unreserving a lock not reserved to the current thread has no effect on the lock. Therefore, the previously existing monexits (unreserve only) remain undisturbed. These effects are enabled through creation of the monent (reserve only) and monexit (unreserve only) operations not changing the sequence of previously existing monent and monexit sequences observed on all paths through the loop. More specifically, the sequence of lock acquisition and release operations will remain unchanged after the loop lock reservation transformation. While the current thread holds the reservation, other threads cannot acquire the lock, even if the reserving thread does not hold the lock, without the cooperation of the reserving thread, i.e., a reservation cancellation. Accordingly, extending a lock reservation across a loop preserves the lock acquisition and release order, thereby preventing incorrect synchronization behavior, i.e., deadlocks or livelocks.

Figure 3:
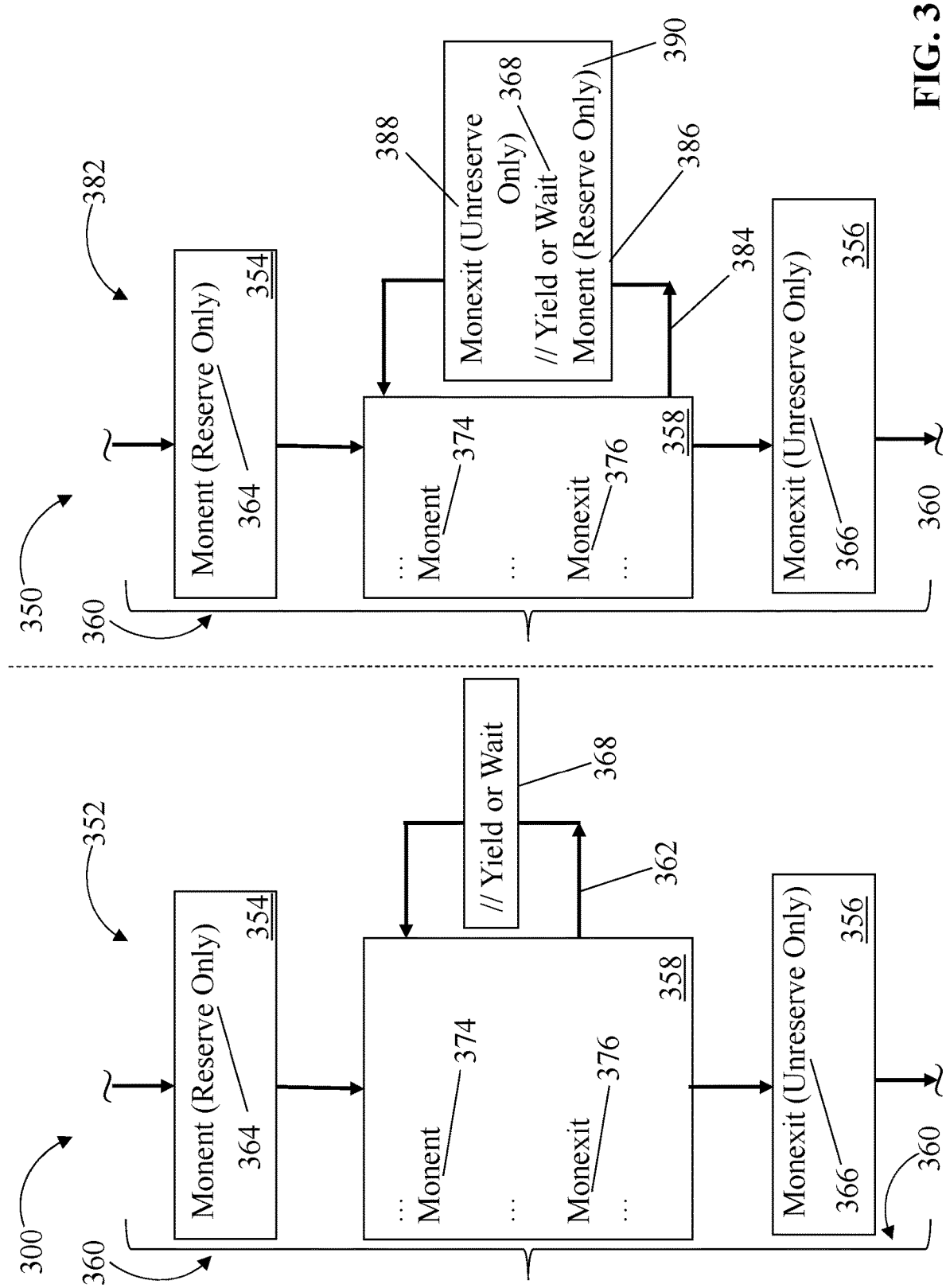
FIG. 3 is a schematic diagram illustrating a portion of a program with the loop lock reservation transformation of FIG. 2 further transformed to show implementation of cooperative multitasking, in accordance with some embodiments of the present disclosure.

Referring to FIG. 3, a schematic diagram is provided illustrating a portion 382 of a program 350 with a loop-scoped lock reservation 360 transformation that is the loop-scoped lock reservation 260 further transformed to show implementation of cooperative multitasking. The portion 352 of the program 300 as shown in FIG. 3 is substantially similar to the portion 252 of the program 250, respectively, as shown in FIG. 2. Accordingly, the components of the portion 352 of the program 300 in FIG. 3 are substantially similar to the similarly numbered components of the portion 252 of the program 250 shown in FIG. 2. Accordingly. the portion 352 of the program 300 is provided in FIG. 3 to more clearly show contrast with the portion 382 of the program 350.

The portion 382 of the program 350 includes the components of the portion 352 of the program 300 with the exception of the loop 362 replaced with a loop 384 that includes a cooperative multitasking operations 386. The cooperative multitasking operations 386 includes the async check operation 368 embedded therein. In addition, the cooperative multitasking operations 386 includes a monexit (unreserve only) operation 388 and a monent (reserve only) operation 390 embedded therein. The monexit (unreserve only) operation 388 and the monent (reserve only) operation 390 are compile-time artifacts generated by the lock reservations transformation logic 132.

In general, the longer a reservation is held by a particular thread, the greater the potential for contention on the reserved lock. As discussed elsewhere herein, and in general, yielding of a reservation by a thread within a loop may be a relatively expensive action. However, contention on the reserved lock may require a reservation cancellation to occur at runtime to ensure concurrently executing threads are able to continue to make progress, which would be more expensive due to cross-thread synchronization and threads blocking, such threads waiting to acquire locks rather than performing useful work. Therefore, to reduce the risk of contention leading to reservation cancellation while still obtaining much of the benefit from loop lock reservation, a periodic release of the loop lock reservation of the presently running thread to allow other threads to acquire the lock is added. In other words, yield points may be established for the extended loop execution. Therefore, periodic checks are performed by the system to determine if the aforementioned activities are due, or overdue, and will provide opportunities for the active thread to yield the loop lock reservation temporarily to execute the other priorities. Such periodic checks include features referred to herein as "async check" features.

In at least one embodiment, the cooperative multitasking operations 386 are generated by the lock reservation transformation logic 132 of compiler 130. Also, in at least some embodiments, the cooperative multitasking operations 386 includes the async check operation 368. In some embodiments, some or all of the async check logic is embedded into the runtime code 142 by the async check insertion logic 134 in compiler 130.

As the loop 384 progresses through the iterative successive monent 374-monexit 376 operations pairs, the computer system 100 may need to perform a number of activities, for example, and without limitation, housekeeping activities such as garbage collection, safety checks, or simply allowing another thread of execution to run. For the circumstances where the execution of the loop 384 is sufficiently extensive, such loop execution may need to temporarily yield to facilitate such other activities. To accommodate such yields, the async check operations 368 implements a yield of the execution of the loop 384. Firstly, a monexit (unreserve only) operation 388 unreserves the lock reserved across the loop 384 from the current thread. Then, the async check operation 368 forces the loop 384 to yield to the other threads. Notably, the yield just allows some other threads to run, and not necessarily another thread for processing loop 384. By unreserving the reservation, we prevent a cancellation of the reservation if the thread which runs after the yield is trying to acquire one of the locks that has been reserved. It may not be necessary to yield on every loop iteration so the lock unreservation operation (388)-yield operation (as a portion of the async check operation 368)-reservation operation (390) sequence and may only have to occur periodically as the loop execution progresses. Once the current thread resumes execution, the monent (reserve only) 390 attempts to restore the lock reservation to the current thread to recommence performance of the iterative activities within the loop 384. Such a restoration may fail, and if it does, such failure to restore the lock reservation leads to lower performance, but the program will remain functionally correct. Accordingly, further transforming the second structure in the portion 352 of program 300 to the third structure in the portion 382 of the program 350 incudes adding the cooperative multitasking operations 386, which includes the features necessary to yield the loop lock reservation to facilitate cooperative multitasking with other threads that require use of the lock.

In at least one embodiment, the periodicity of the async checks may be determined through observation of the other run-time activities such that an asynchronous operation may not be necessary after every successive execution of the loop. Rather, the async check can be implemented to perform the checks with sufficient periodicity to ensure the other run-time activities are sufficiently managed, thereby facilitating cooperative multitasking, sometimes referred to as cooperative threading. For example, in at least one embodiment, for loops that are typically not counted, a loop counter (not shown) could be introduced within the loop 384 as a permanent fixture therein. For such a counter, a predetermined number of iterations of the loops (e.g., X iterations) may be permitted to run, and the loop lock reservation may be yielded to perform the async check. In at least one embodiment, the system counts the number of successive iterations of the monent 374-monexit 376 operations pairs, and once the value of the successive iterations of the loop exceeds a predetermined threshold value, the existing loop reservation is yielded for the async check through the cooperative multitasking operations 386.

Also, for example, in at least one embodiment, for a counted loop, the loop primary induction variable (a variable that increases or decreases in a predictable manner through every iteration of the loop) modulo (division remainder) is tested for zero, thereby indicating the need to yield control and so to run the async check operation 368. Under the circumstances where the outcome indicates "true", a monexit (unreserve only) operation for each lock reserved across the loop, followed by a lock reservation. In some embodiments, the attainment of the lock reservation may be subject to a delay of a scheduler yield to provide other threads the opportunity to acquire the lock while the reservation is released. In at least some embodiments, any counting method that enables operation of the computing system 100 and the portion 382 of the program 350 may be used. Accordingly, each successive execution of the loop 384 is counted and the resultant value is used to determine if an extended-running loop needs to be yielded.

Regardless of the loop counting mechanism, the async check operation 368 are embodied in the runtime code 142 produced by the compiler 130 which will perform the yielding of the loop reservation by the thread. Once the aforementioned monent 374-monexit 376 operations pair counter threshold value is attained as determined by the computing system 100, the async check operation 368 will execute. In addition, the monexit (unreserve only) operation 388 and the monent (reserve only) operation 390 are compile-time artifacts generated by the lock reservation transformation logic 132. Once the other threads have completed their related activities, the loop trip counter (not shown) will be reset to zero to restart the counter and the previously running thread will recommence performance of the iterative activities within the loop 384, at least until the loop trip counter threshold value is again attained. While there is a small execution cost to the temporary release of the loop reservation and reacquisition, the overall benefit of this scheme includes X–1 cycles of the loop reservation not required to be performed. Accordingly, the cost of the reservation release and re-reservation is amortized across the execution of the loop, thereby minimizing the synchronization costs.

Figure 4:
FIG. 4 is an illustrative example of code including a lock reservation consistent with the lock reservation schematic diagram shown in FIG. 2, in accordance with some embodiments of the present disclosure.

Referring to FIG. 4, and FIG. 2, an illustrative example of the code 400 including lock acquire and release operations 210 consistent with the portion of the code 202 in the lock reservation schematic diagram shown in FIG. 2 is provided. The notable portion of the code 400 to illustrate the implementation of the lock acquire and release operations 210 include lines 403 through 411. Code 400 is configured to reserve the lock acquire and release operations 210 around the sequence of four calls to OutputStream.write(int), i.e., lines 405-408. The four calls are achieved through the monent operation 214 acquiring the lock acquire and release operations 210 and the monexit operation 216 cancelling the lock acquire and release operations 210 for the first iteration 405. The loop 212 returns to the monent operation 214 iteratively for lines 406 through 408. Accordingly, the lock acquire and release operations 210 include acquisitions and releases of the lock, which are expensive in an iterative sequence.

Referring to FIG. 5, and FIG. 3, an illustrative example of the code 500 is provided showing the code 400 of FIG. 4 modified to include implementation of the loop-scoped lock reservation 360 transformation consistent with the loop lock reservation schematic diagram shown in FIG. 3. As shown in FIG. 5, the line 421 of FIG. 4 is replaced by lines 503-507 of FIG. 5. Using the code 500 of FIG. 5, the monent (reserve only) operation 364 creates the loop-scoped lock reservation 360 that remains reserved for the duration of the execution of lines 504 through 507 through the loop 362, and the loop-scoped lock reservation 360 is unreserved by the monexit (unreserve only) operation 366. The replacement of line 421 with lines 503 to 507 is the result of inlining the body of writeInt into the loop contained in serializeData. Referring to FIG. 6, an illustrative example of the code 600 is provided showing the code of FIG. 5 modified to include implementation of the cooperative multitasking operations 386 consistent with the schematic diagram shown in FIG. 3. Accordingly, the loop lock reservation as shown in FIG. 6, lines 602-617 of the code 600, facilitates accelerating those loops which repeatedly lock the same object on the most common code paths. For example, considering a loop which is serializing data using the write methods of classes in the java.io namespace, the write methods on these different classes are generally synchronized to ensure data written by different threads is not interleaved. The line 602 is equivalent to the monent (reserve only) operation 364 to reserve the lock and the loop 384 is permitted to run iteratively to execute lines 605-608. Line 612 is equivalent to the monexit (unreserve only) operation 388, line 613 is equivalent to the async check operation 368, and line 614 is equivalent to the monent (reserve only) operation 390. Line 617 is equivalent to the monexit (unreserve only) operation 366.

Figure 7:
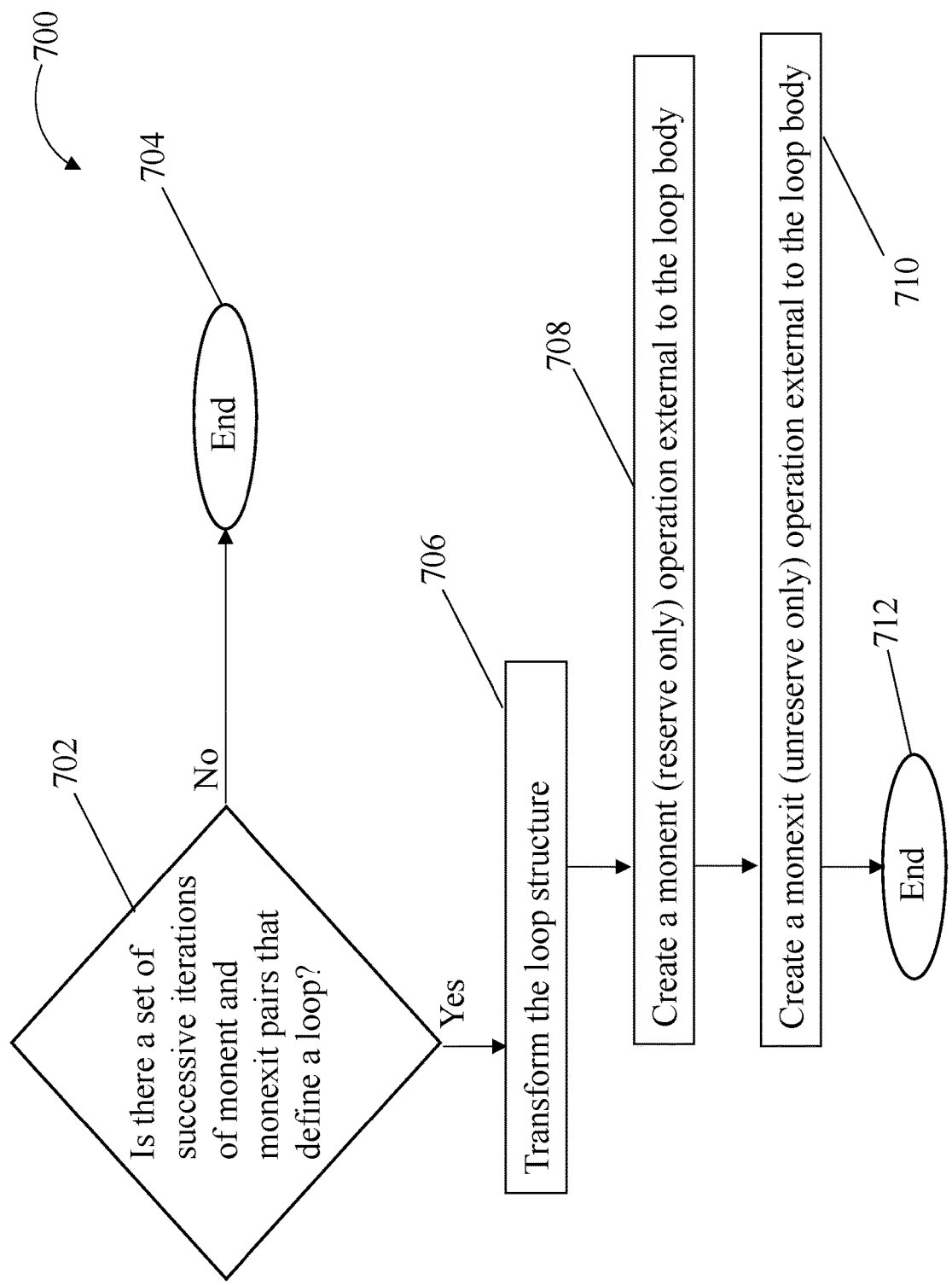
FIG. 7 is a flow chart illustrating a process for implementing a loop lock reservation during compile-time, in accordance with some embodiments of the present disclosure.

Referring to FIG. 7, and also referring to FIGS. 1-3, a flow chart is provided illustrating a process 700 for implementing a loop lock reservation at compile-time. A determination operation 702 is executed to determine if a set of successive iterations of monent 214-monexit 216 operations pairs define the loop 212. In one embodiment, the determination operation 702 is performed through scanning the sequence of instructions in the code. A negative response to the determination operation 702 ends 704 the process 700. A positive response to the determination operation 702 results in transforming 706 the portion 202 of the program 200 to the portion 352 of the program 300 through transforming the loop structure. The transforming 706 includes creating 708 the monent (reserve only) operation 364 at the loop header 354 external to the loop body 358. The monent (reserve only) operation 364 is created through the lock reservation transformation logic 132 run by the compiler 130 whose result is embedded in the produced runtime code 142. The monent (reserve only) operation 364 is configured to, reserve the lock to the current thread. Accordingly, the computing system 100 includes features to determine those loops that may have a potential for transformation as described herein to improve the economy of execution.

In addition, the transformation 706 include creating 710 the monexit (unreserve only) operation 366, at the loop exit 356 external to the loop body 358. The monexit (unreserve only) operation 366 is created through the lock reservation transformation logic 132 run by the compiler 130 whose result is embedded in the produced runtime code 142. The monexit (unreserve only) operation 366 is configured to unreserve the lock from the current thread. The loop-scoped lock reservation 360 extends across the entire loop 362, as well as the monent (reserve only) operation 364 and the monexit (unreserve only) operation 366. Both the monent (reserve only) operation 364 and the monexit (unreserve only) operation 366 are created 708 and 710, respectively, at compile-time, i.e., lock reservation transformation logic 132 is run by the compiler 130. Accordingly, transforming 706 the portion 202 of the program 200 to the portion 352 of the program 300 includes transforming the lock acquire and release operations 210 to the loop-scoped lock reservation 360, resulting in the portion 352 of the program 300 including the monent (reserve only) operation 364 and the monexit (unreserve only) operation 366 both residing outside of the loop body 358. Upon completion of the loop transformation operation 706, the compile-time process 700 ends 712.

Figure 8A:
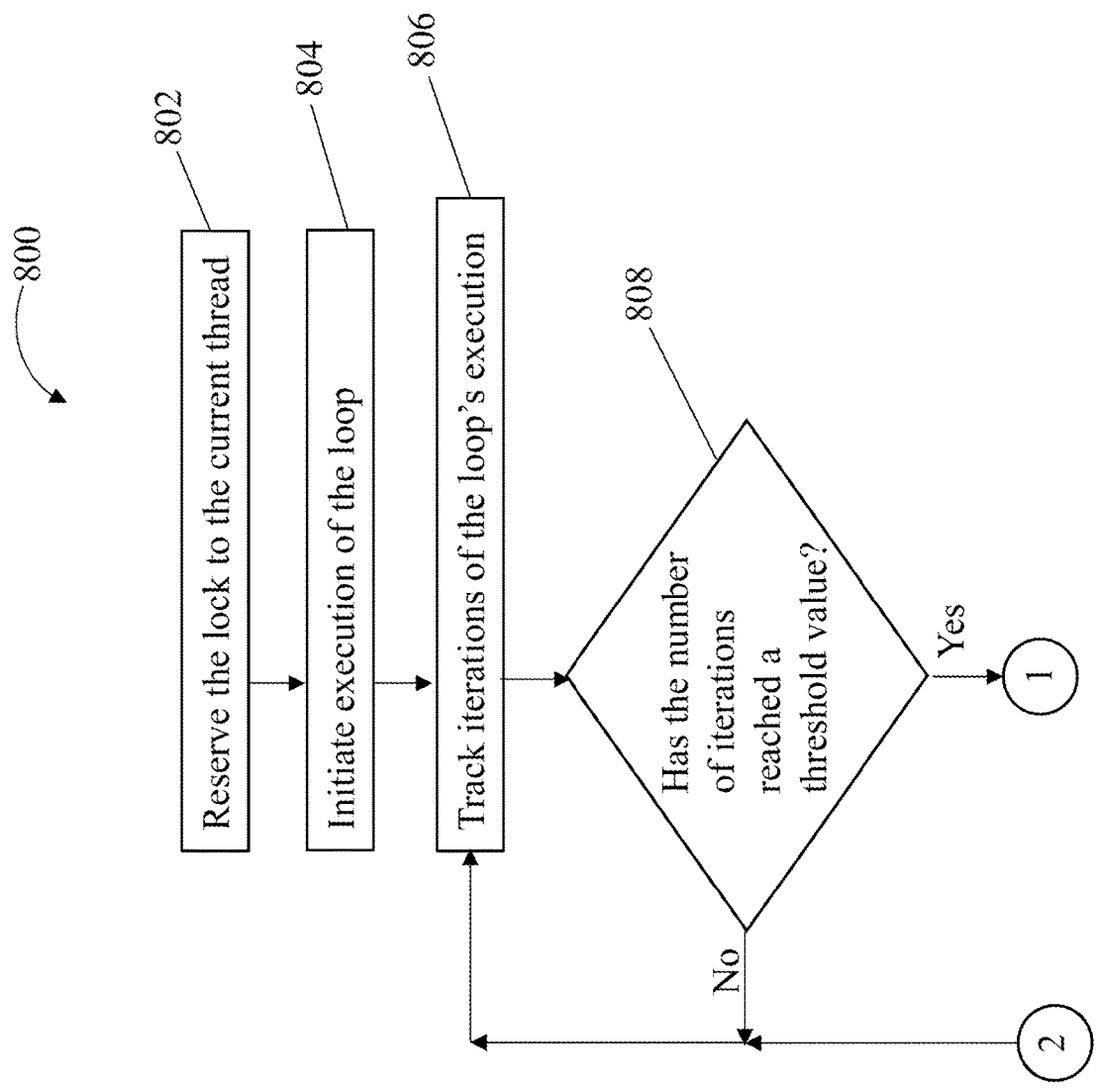
FIG. 8A is a flow chart illustrating a process for further implementing a loop lock reservation including cooperative multitasking at runtime, in accordance with some embodiments of the present disclosure.

Referring to FIG. 8A, and also referring to FIGS. 1-3 and 7, a flow chart is provided illustrating a process 800 for further implementing a loop lock reservation including cooperative multitasking at runtime. Upon completion of the transforming 706 at the compile-time, the lock is reserved 802 to the current thread by the monent (reserve only) operation 364 as a portion of the runtime operations. Execution of the loop 362 is initiated 804 and as the execution of the iterations progresses, an interacting counter mechanism as discussed herein tracks 806 the iterations. It may not be necessary to yield on every loop iteration so the lock unreservation operation (388)-yield operation (as a portion of the async check operation 368)-reservation operation (390) sequence may only have to occur periodically as the loop execution progresses. It is determined 808 if the number of iterations has reached a threshold value. In at least some embodiments, the threshold value is established through recordation and analysis of empirical data. A negative response to the determination operation 808 results in the process 800 returning to the track iterations operation 806. Accordingly, the computing system 100 includes a runtime mechanism to determine if a loop is sufficiently extensive with respect to execution time and resource utilization to require the cooperative multitasking features as described further herein.

Figure 8B:
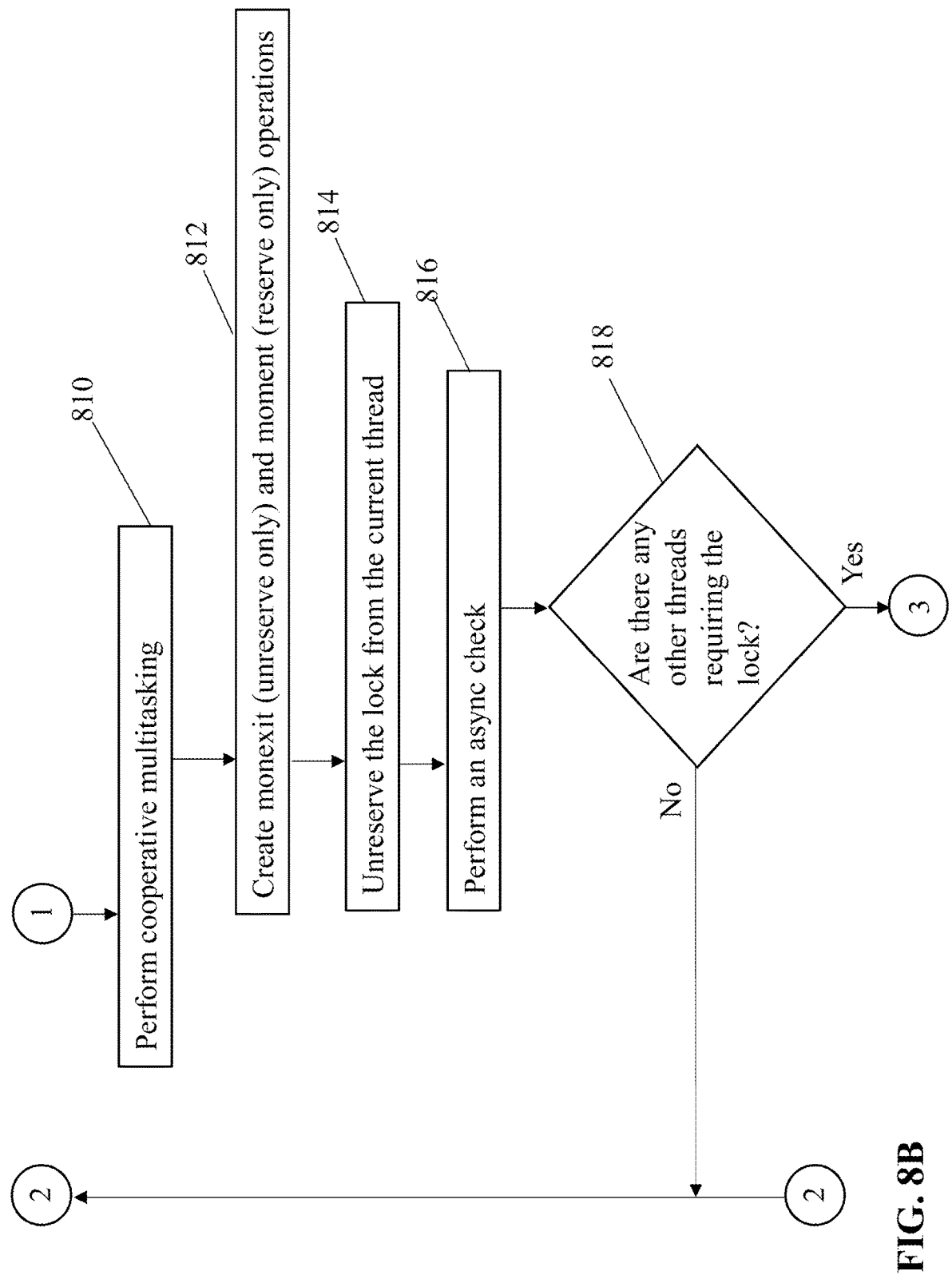
FIG. 8B is a continuation of the flowchart from FIG. 8A, in accordance with some embodiments of the present disclosure.
Figure 8C:
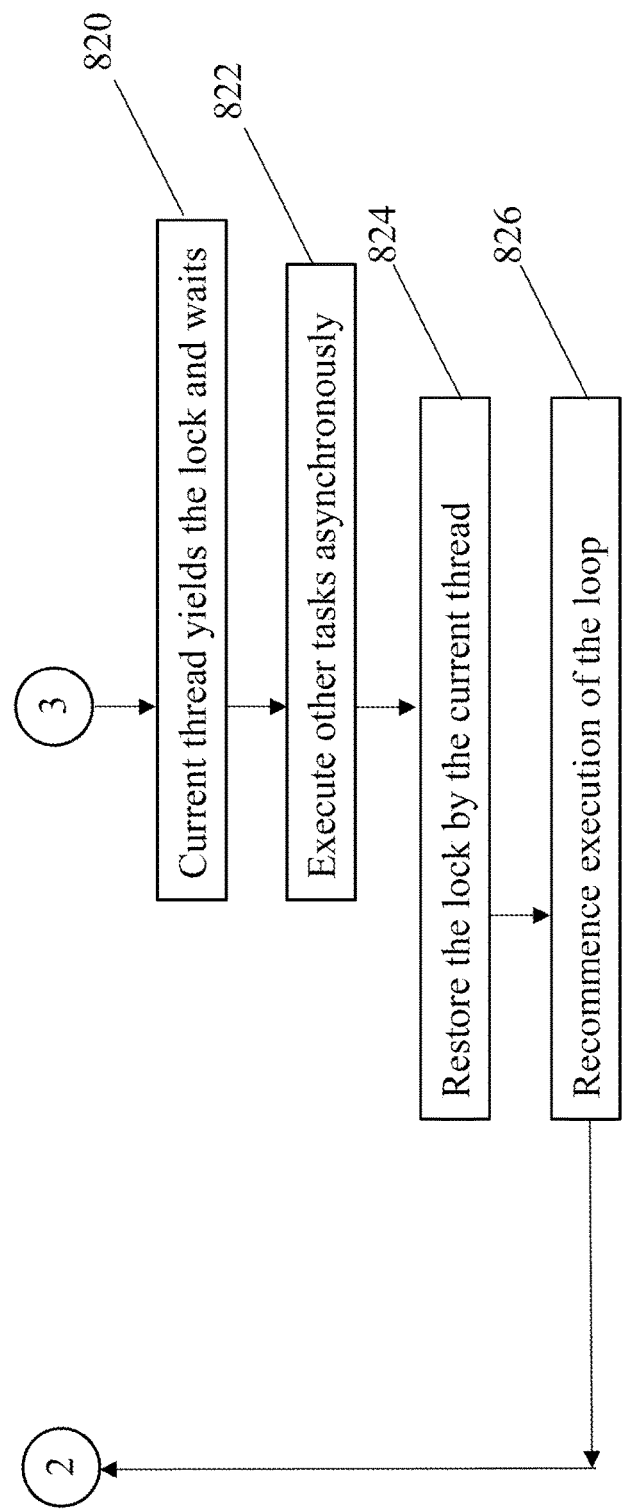
FIG. 8C is a continuation of the flowchart from FIG. 8B, in accordance with some embodiments of the present disclosure.

Referring to FIG. 8B, a continuation of the flowchart from FIG. 8A is provided, in accordance with some embodiments of the present disclosure. A positive response to the determination operation 808 results in performing 810 cooperative multitasking. The performance operation 810 of the cooperative multitasking includes the creation 812 of the monexit (unreserve only) operation 388 and the monent (reserve only) operation 390. As discussed herein, the monexit (unreserve only) operation 388 and the monent (reserve only) operation 390 are runtime artifacts created by the cooperative multitasking scheme module 152 just in time for performing the cooperative multitasking. These operations 388 and 390 are positioned adjacent to the async check operation 368 to form the cooperative multitasking operations 386. The monexit (unreserve only) operation 388 unreserves 814 the lock on the loop 384 from the current thread. Then, the async check operation 368 performs 816 an async check operation. Specifically, the async check operation 368 makes a determination 818 if there any other threads representing other system-directed activities, including, and without limitation, garbage collection and safety checks, that are presently required to be executed. A negative response to the determination operation 818 results in the process 800 returning to the track iterations operation 806. Referring to FIG. 8C, a continuation of the flowchart from FIG. 8B is provided, in accordance with some embodiments of the present disclosure. A positive response to the determination operation 818 results in the current thread yielding 820 the lock to the other threads selected to enter the loop 384 and directs the previously running thread to wait for the other threads to complete their activities. Therefore, the currently released and unreserved thread, through the yield-and-wait instructions of the async check module 368, yields 820 the lock and the current thread is temporarily held and waits while the async check is performed 816. Notably, the yield just allows some other threads to run, and not necessarily another thread for processing loop 384. By unreserving the reservation prior to the yield, a cancellation of the reservation is prevented if the thread which runs after the yield is trying to acquire the reserved lock.

While the recently-yielding current thread is waiting until the other threads complete their activities, the other system-directed tasks are executed 822 asynchronously as directed by the virtual machine 140 or the operation system of the computing system 100. Once the other threads have completed, the monent (reserve only) operation 390 restores 824 the loop lock reservation to the previously running thread to recommence execution 826 of the iterative activities within the loop 384 and process 800 returns to the track iterations operation 806. In addition, the monent 374-monexit 376 operations pair counter will be reset to zero to restart the counter and the previously running thread will recommence performance of the iterative activities within the loop 384, at least until the determination operation 808 determines that the monent 374-monexit 376 operations pair counter threshold value is again attained.

Accordingly, the cooperative multitasking operations 386 implements the features necessary to yield the loop reservation to facilitate cooperative multitasking with other threads that require a reservation on the lock.

Figure 9:
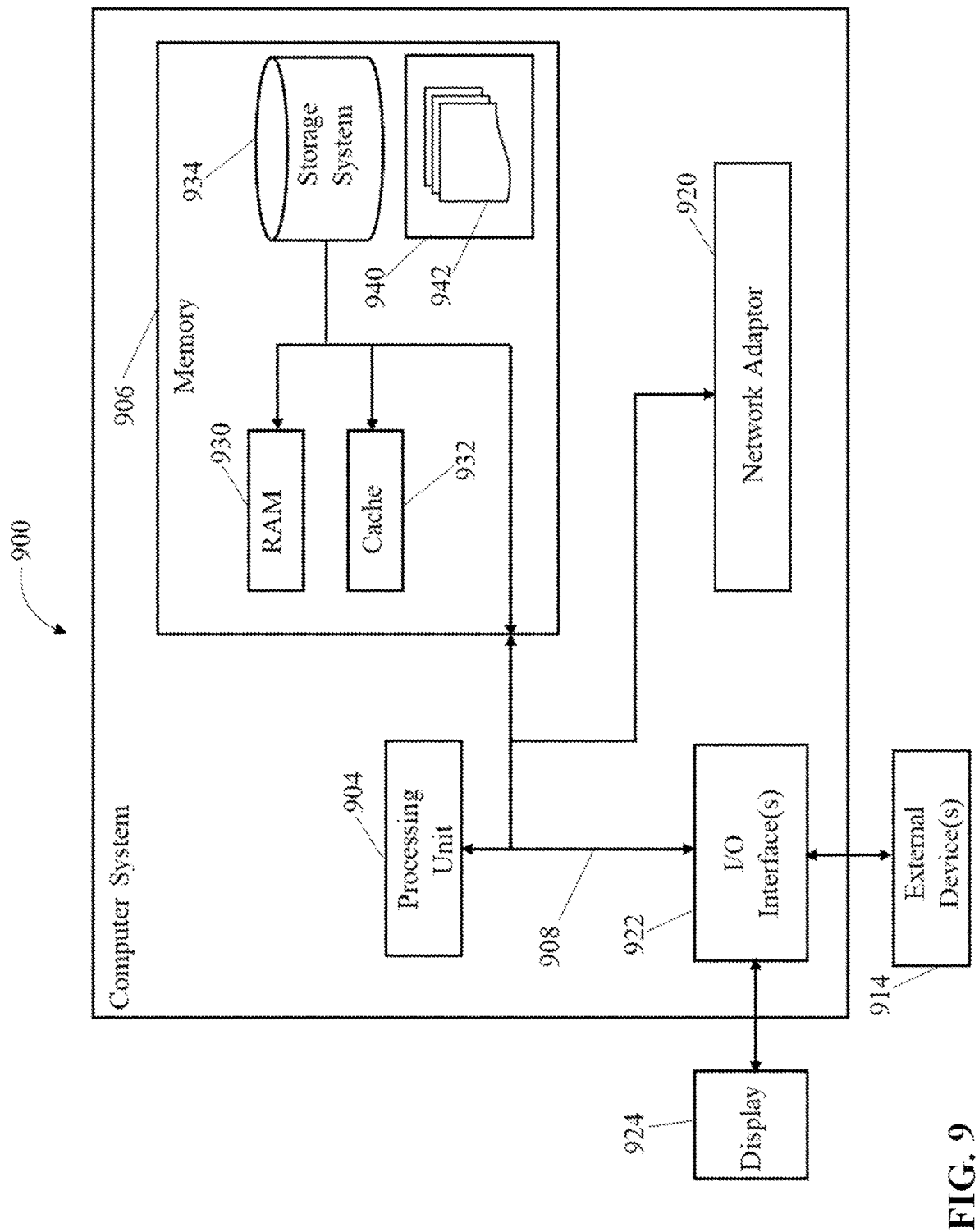
FIG. 9 is a block diagram illustrating a computer system/server of a cloud-based support system, to implement the processes described above with respect to FIGS. 1-8, in accordance with some embodiments of the present disclosure.

Aspects of the computing system 100 may be embodied in a computer system/server in a single location, or in at least one embodiment, may be configured in a cloud-based system sharing computing resources. With reference to FIG. 9, a block diagram is provided illustrating an example of a computer system 900 including a computer/server 902, hereinafter referred to as a host 902 in communication with a cloud based support system, to implement the system, tools, and processes described above with respect to FIGS. 1-8. Host 902 is operational with numerous other general purpose or special purpose computer system environments or configurations. Examples of well-known computer systems, environments, and/or configurations that may be suitable for use with host 902 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

Host 902 may be described in the general context of computer system-executable instructions, such as program modules, being executed by a computer system. Generally, program modules may include routines, programs, objects, components, logic, data structures, and so on that perform particular tasks or implement particular abstract data types. Host 902 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, host 902 is shown in the form of a general-purpose computing device. The components of host 902 may include, but are not limited to, one or more processors or processing devices or units 904, e.g. hardware processors, a system memory 906, and a bus 908 that couples various system components including system memory 906 to processing device 904. Bus 908 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Host 902 typically includes a variety of computer system readable media. Such media may be any available media that is accessible by host 902 and it includes both volatile and non-volatile media, removable and non-removable media.

Memory 906 can include computer system readable media in the form of volatile memory, such as random access memory (RAM) 930 and/or cache memory 932. By way of example only, a storage system 934 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 908 by one or more data media interfaces.

Program/utility 940, having a set (at least one) of program modules 942, may be stored in memory 906 by way of example, and not limitation, as well as an operating system, one or more application programs, other program modules, and program data. Each of the operating systems, one or more application programs, other program modules, and program data or some combination thereof, may include an implementation of a networking environment. Program modules 942 generally carry out the functions and/or methodologies of embodiments to dynamically capture environmental configuration changes related to applications such that holding a loop lock reservation across some or all of the iterations of a loop, and under certain conditions, to temporarily effect a running thread to yield the reservation and allow other threads to reserve the lock is enabled. For example, the set of program modules 942 may include the scheduler module 120, the compiler 130 including the lock reservation transformation logic 132 and the async check insertion logic 134, and the execution synchronization module 150 and the cooperative multitasking scheme module 152 in the virtual machine 140, as described in FIGS. 1-8.

Host 902 may also communicate with one or more external devices 914, such as a keyboard, a pointing device, etc.; a display 924; one or more devices that enable a user to interact with host 902; and/or any devices (e.g., network card, modem, etc.) that enable host 902 to communicate with one or more other computing devices. Such communication can occur via Input/Output (I/O) interface(s) 922. Still yet, host 902 can communicate with one or more networks such as a local area network (LAN), a general wide area network (WAN), and/or a public network (e.g., the Internet) via network adapter 920. As depicted, network adapter 920 communicates with the other components of host 902 via bus 908. In at least one embodiment, a plurality of nodes of a distributed file system (not shown) is in communication with the host 902 via the I/O interface 922 or via the network adapter 920. It should be understood that although not shown, other hardware and/or software components could be used in conjunction with host 902. Examples, include, but are not limited to: microcode, device drivers, redundant processing units, external disk drive arrays, RAID systems, tape drives, and data archival storage systems, etc.

In this document, the terms "computer program medium," "computer usable medium," and "computer readable medium" are used to generally refer to media such as main memory 906, including RAM 930, cache memory 932, and storage system 934, such as a removable storage drive and a hard disk installed in a hard disk drive.

Computer programs (also called computer control logic) are stored in memory 906. Computer programs may also be received via a communication interface, such as network adapter 920. Such computer programs, when run, enable the computer system to perform the features of the present embodiments as discussed herein. In particular, the computer programs, when run, enable the processing device 904 to perform the features of the computer system. As such, computer programs may represent controllers of the computer system. Accordingly, the functionality for the scheduler module 120 and the embedded loop lock reservation synchronization scheme module 122, and the compiler 130 including the lock reservation transformation logic 132, the async check insertion logic 134, and the async module logic module 136, as described in FIGS. 1-8, is embodied as computer program code stored in memory 906 (in some embodiments as program modules 942), where the computer program code includes the instructions to be executed by the processing device 904 to provide the functionality of the for the scheduler module 120, the compiler 130 including the lock reservation transformation logic 132 and the async check insertion logic 134, and the execution synchronization module 150 and the cooperative multitasking scheme module 152 in the virtual machine 140, as described herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as JAVA®, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the embodiments. Accordingly, the functionality for the for the scheduler module 120, the compiler 130 including the lock reservation transformation logic 132 and the async check insertion logic 134, and the execution synchronization module 150 and the cooperative multitasking scheme module 152 in the virtual machine 140, as described in FIGS. 1-8, may be embodied as computer readable program instructions to be executed by one or more hardware devices other than, or in addition to, the processing device 904 to provide the functionality of the scheduler module 120, the compiler 130 including the lock reservation transformation logic 132 and the async check insertion logic 134, and the execution synchronization module 150 and the cooperative multitasking scheme module 152 in the virtual machine 140, as described herein.

In at least one embodiment, host 902 is a node of a cloud computing environment. It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

As is known in the art, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Example of such characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher layer of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some layer of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 10:
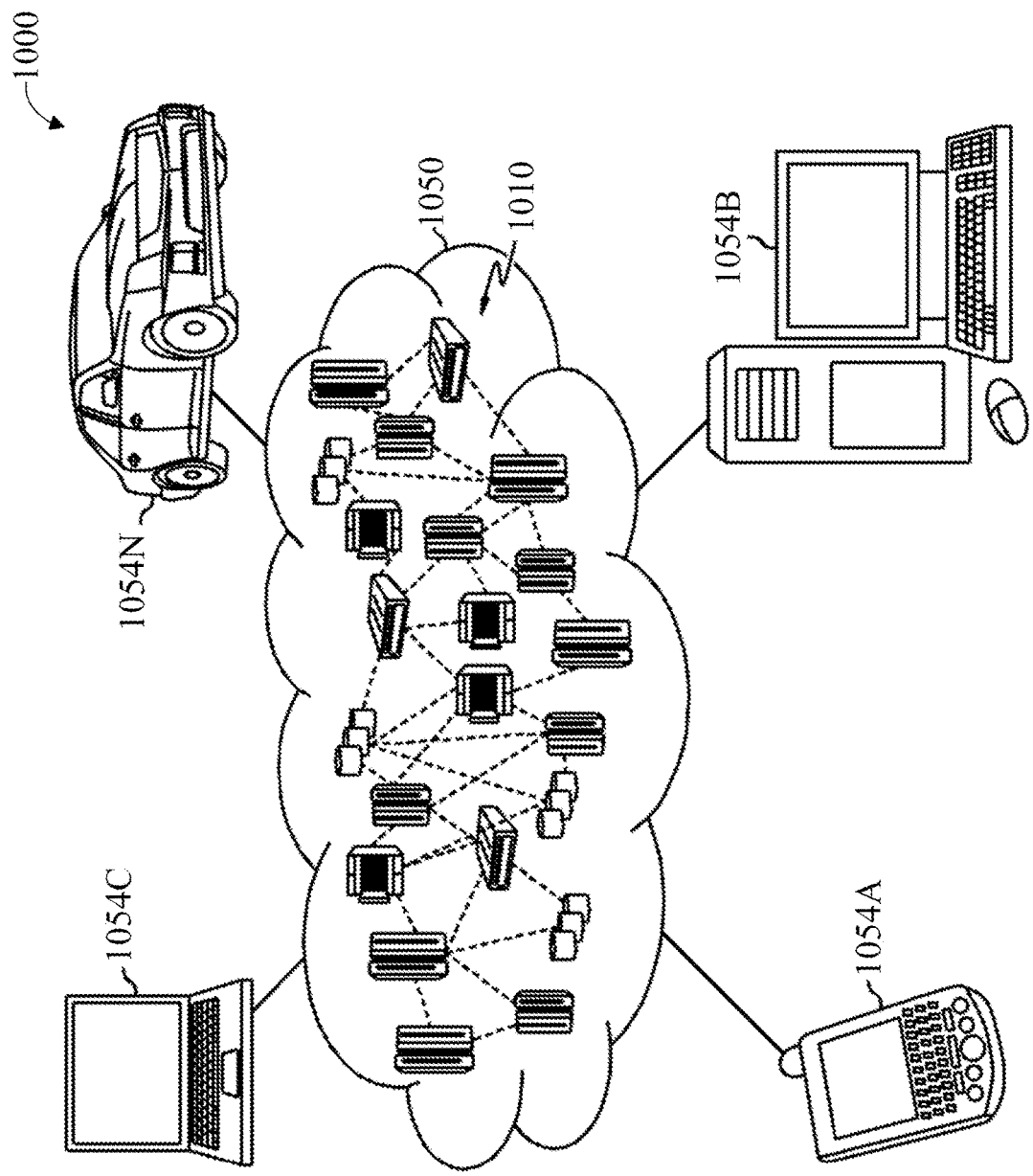
FIG. 10 is a schematic diagram illustrating a cloud computer environment, in accordance with some embodiments of the present disclosure.

Referring now to FIG. 10, a schematic diagram is provided illustrating an example cloud computing network 1000. As shown, cloud computing network 1000 includes a cloud computing environment 1050 having one or more cloud computing nodes 1010 with which local computing devices used by cloud consumers may communicate. Examples of these local computing devices include, but are not limited to, personal digital assistant (PDA) or cellular telephone 1054A, desktop computer 1054B, laptop computer 1054C, and/or automobile computer system 1054N. Individual nodes within nodes 1010 may further communicate with one another. They may be grouped (not shown) physically or virtually, in one or more networks, such as Private, Community, Public, or Hybrid clouds as described hereinabove, or a combination thereof. This allows the cloud computing network 1000 to offer infrastructure, platforms and/or software as services for which a cloud consumer does not need to maintain resources on a local computing device. It is understood that the types of computing devices 1054A-N shown in FIG. 10 are intended to be illustrative only and that the cloud computing environment 1050 can communicate with any type of computerized device over any type of network and/or network addressable connection (e.g., using a web browser).

Figure 11:
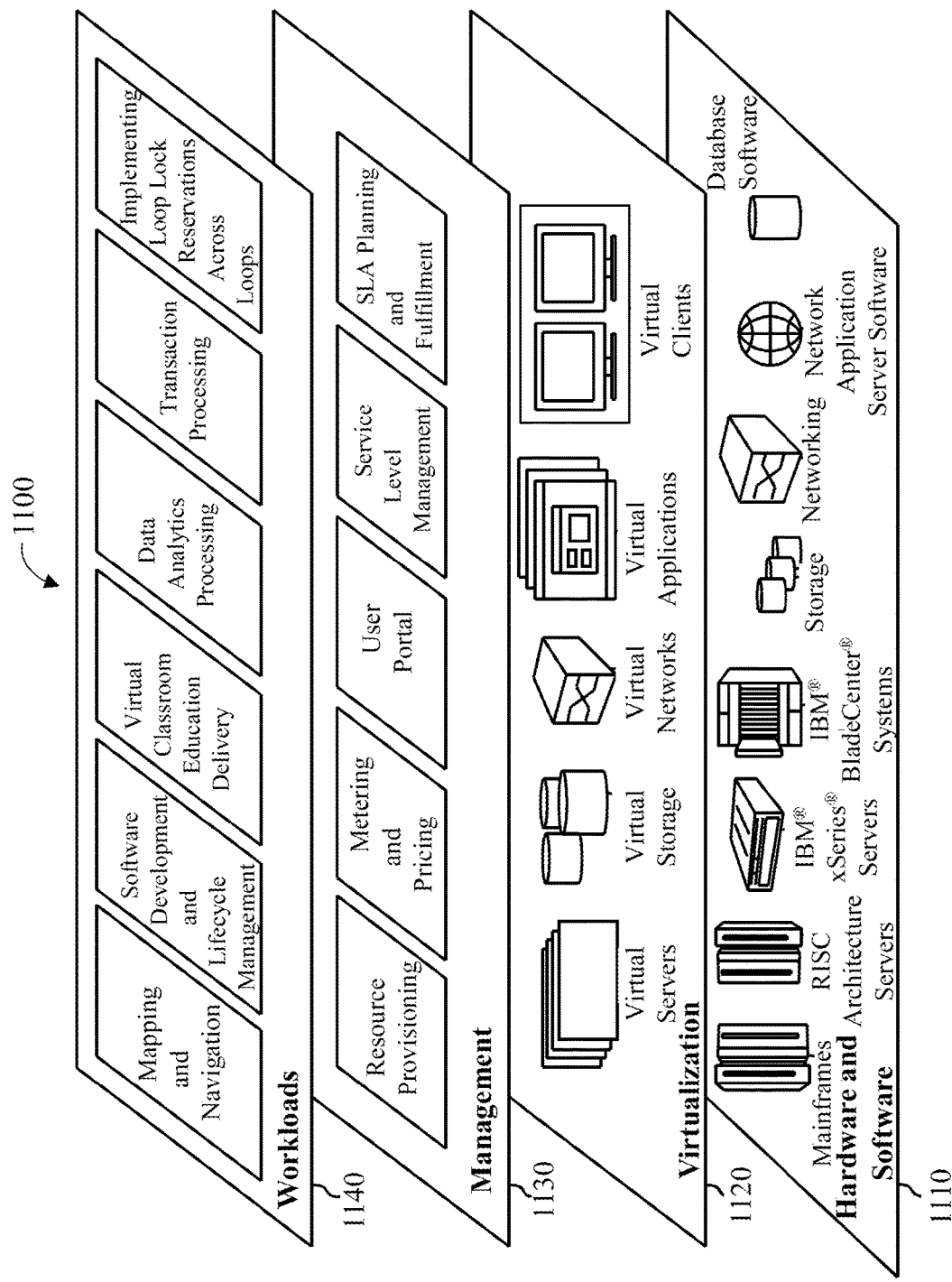
FIG. 11 is a block diagram illustrating a set of functional abstraction model layers provided by the cloud computing environment, in accordance with some embodiments of the present disclosure.

Referring now to FIG. 11, a set of functional abstraction layers 1100 provided by the cloud computing network of FIG. 11 is shown. It should be understood in advance that the components, layers, and functions shown in FIG. 11 are intended to be illustrative only, and the embodiments are not limited thereto. As depicted, the following layers and corresponding functions are provided: hardware and software layer 1110, virtualization layer 1120, management layer 1130, and workload layer 1140.

The hardware and software layer 1110 include hardware and software components. Examples of hardware components include mainframes; RISC (Reduced Instruction Set Computer) architecture-based servers; servers; blade servers; storage devices; networks and networking components.

Examples of software components include network application server software, and database software.

Virtualization layer 1120 provides an abstraction layer from which the following examples of virtual entities may be provided: virtual servers; virtual storage; virtual networks, including virtual private networks; virtual applications and operating systems; and virtual clients.

In one example, management layer 1130 may provide the following functions: resource provisioning, metering and pricing, user portal, service layer management, and SLA planning and fulfillment. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service layer management provides cloud computing resource allocation and management such that required service layers are met. Service Layer Agreement (SLA) planning and fulfillment provides pre-arrangement for, and procurement of, cloud computing resources for which a future requirement is anticipated in accordance with an SLA.

Workloads layer 1140 provides examples of functionality for which the cloud computing environment may be utilized. Examples of workloads and functions which may be provided from this layer include, but are not limited to: mapping and navigation; software development and lifecycle management; virtual classroom education delivery; data analytics processing; transaction processing; and implementing loop lock reservations across loops, and, more specifically, for holding a loop lock reservation across some or all of the iterations of a loop, and under certain conditions, to temporarily effect a running thread to yield the reservation and allow other threads to reserve the lock.

It will be appreciated that there is disclosed herein a system, method, apparatus, and computer program product for implementing loop lock reservations across loops, and, more specifically, for holding a loop lock reservation across some or all of the iterations of a loop, and under certain conditions, to temporarily effect a running thread to yield the reservation and allow other threads to reserve the lock.

While particular embodiments of the present disclosure have been shown and described, it will be obvious to those skilled in the art that, based upon the teachings herein, changes and modifications may be made without departing from the embodiments and its broader aspects. Therefore, the appended claims are to encompass within their scope all such changes and modifications as are within the true spirit and scope of the embodiments. Furthermore, it is to be understood that the embodiments are solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to embodiments containing only one such element, even when the same claim includes the introductory phrases "one or more" or "at least one" and indefinite articles such as "a" or "an"; the same holds true for the use in the claims of definite articles.

The present embodiments may be a system, a method, and/or a computer program product. In addition, selected aspects of the present embodiments may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present embodiments may take the form of computer program product embodied in a computer readable storage medium (or media) having computer readable program instructions thereon for causing a processor to carry out aspects of the present embodiments. Thus embodied, the disclosed system, a method, and/or a computer program product is operative to improve the functionality and operation of a computer-based system or platform.

Aspects of the present embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated that, although specific embodiments have been described herein for purposes of illustration, various modifications may be made without departing from the spirit and scope of the embodiments. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. Accordingly, the scope of protection of the embodiments is limited only by the following claims and their equivalents.

What is claimed is:

1. A computer-implemented method comprising:
    defining a first structure of instructions, wherein the first structure of instructions includes a plurality of successive iterations of first monent-monexit pairs that at least partially define a monent-monexit loop that includes a loop header, loop body, and loop exit that are sequentially coupled;
    determining a value of the plurality of successive iterations of the first monent- monexit pairs exceeds a predetermined threshold; and
    transforming subject to the determining, the first structure of the instructions to a second structure of instructions comprising:
        generating a second monent at the loop header; and
        generating a second monexit at the loop exit, wherein the plurality of successive iterations of the first monent-monexit pairs remain unmodified inside the loop body.

2. The method of claim 1, wherein the transforming further comprising:
    generating the second monent, wherein the second monent includes only lock reservation features, the first monent including lock acquisition features; and
    generating the second monexit, wherein the second monexit includes only unreservation features, the first monexit includes lock reservation cancellation features.

3. The method of claim 2, wherein:
    the second monent and the second monexit are compile-time transformations.

4. The method of claim 2, further comprising:
    creating, through the second monent and the second monexit, a lock reservation on the monent-monexit loop to a first thread.

5. The method of claim 1, further comprising further transforming the second structure of the instructions to a third structure of the instructions comprising: implementing cooperative multitasking features comprising:
    implementing a third monexit, wherein the third monexit and the second monexit include an unreserve only configuration;
    implementing an async check; and
    implementing a third monent, wherein the third monent and the second monent include a reserve only configuration.

6. The method of claim 5, wherein:
    implementing the third monexit and implementing the third monent is executed at a runtime.

7. The method of claim 5, wherein:
    implementing the async check is executed at a compile-time.

8. The method of claim 5, further comprising:
    unreserving, through the third monexit, a loop lock reservation for a first thread;
    determining, through the async check, one or more second threads requiring access to the monent-monexit loop;
    yielding, through the async check, execution of the monent-monexit loop by the first thread; and
    executing the tasks of the one or more second threads.

9. The method of claim 8, further comprising:
    reserving, through the third monent, the lock reservation to the first thread; and
    recommencing execution of the monent-monexit loop by the first thread.

10. The method of claim 1, wherein:
    the second structure includes two or more processing paths, the two or more processing paths being conditional, the transformation comprising one or more fourth monexits, wherein the one or more fourth monexits include an unreserve only configuration.

11. The method of claim 10, wherein:
    implementation of the one or more fourth monexits do not affect the second monexit.

12. The method of claim 11, wherein:
    the second monent and the second monexit define a second monent-monexit pair resident within a first processing path of the plurality of processing paths, one or more third monents and one or more third monexits define one or more third monent-monexit pairs resident within a second processing path of the plurality of processing paths, wherein a sequence of the second monent-monexit pair and the one or more third monent-monexit pairs are unchanged by the transformation.

13. A computer system comprising:
    one or more processors defining a multi-threaded processing environment;
    one or more memory devices communicatively coupled to the one or more processors, wherein the one or more processors configured to:
        define a first structure of instructions, wherein the first structure of instructions includes a plurality of successive iterations of first monent-monexit pairs that at least partially define a monent-monexit loop that includes a loop header, loop body, and loop exit that are sequentially coupled;
        determine a value of the plurality of successive iterations of the first monent-monexit pairs exceeds a predetermined threshold; and
        transform, subject to the determination, the first structure of the instructions to a second structure of instructions comprising:
            generation of a second monent at the loop header; and generation of a second monexit at the loop exit, wherein the plurality of successive iterations of the first monent-monexit pairs remain unmodified inside the loop body.

14. The system of claim 13, further comprising a compiler within the one or more memory devices, the compiler configured to:
   generate the second monent, wherein the second monent includes only lock reservation features, the first monent including lock acquisition features; and
   generate the second monexit, wherein the second monexit includes only unreservation features, the first monexit includes lock reservation cancellation features.

15. The system of claim 14, further comprising:
   the compiler further configured to create, through the second monent and the second monexit, a lock reservation on the monent-monexit loop to a first thread.

16. The system of claim 13, further comprising a virtual machine configured to cooperate with the compiler to transform the second structure of the instructions to a third structure of the instructions, wherein the third structure of the instructions is configured to implement a cooperative multitasking scheme including:
   a third monexit, implemented through the virtual machine at runtime, wherein the third monexit and the second monexit include an unreserve only configuration;
   an async check, implemented through the compiler at compile-time; and
   a third monent, implemented through the virtual machine at runtime, wherein the third monent and the second monent include a reserve only configuration.

17. The system of claim 16, the one or more processors further configured to:
   unreserve, through the third monexit, a loop lock reservation for a first thread;
   determine, through the async check, one or more second threads requiring access to the monent-monexit loop;
   yield, through the async check, execution of the monent-monexit loop by the first thread;
   execute the tasks of the one or more second threads; and
   reserve, through the third monent, the lock reservation to the first thread; and
   recommence execution of the monent-monexit loop by the first thread.

18. The system of claim 13, wherein:
   the second structure includes two or more processing paths, the two or more processing paths being conditional, the transformation including one or more fourth monexits, wherein the one or more fourth monexits include an unreserve only configuration.

19. The system of claim 18, wherein:
   implementation of the one or more fourth monexits does not affect the second monexit; and
   the second monent and the second monexit define a second monent-monexit pair resident within a first processing path of the plurality of processing paths, one or more third monents and one or more third monexits define one or more third monent-monexit pairs resident within a second processing path of the plurality of processing paths, wherein a sequence of the second monent-monexit pair and the one or more third monent-monexit pairs are unchanged by the transformation.

20. A computer program product for implementing loop lock reservations, the computer program product comprising:
   one or more computer readable storage media; and
   program instructions collectively stored on the one or more computer-readable storage media, the program instructions comprising:
      program instructions to define a first structure of instructions, wherein the first structure of instructions includes a plurality of successive iterations of first monent-monexit pairs that at least partially define a monent-monexit loop that includes a loop header, loop body, and loop exit that are sequentially coupled;
      program instructions to determine a value of the plurality of successive iterations of the first monent-monexit pairs exceeds a predetermined threshold; and
      program instructions to transform, subject to the determination, the first structure of the instructions to a second structure of instructions, comprising:
         program instructions to generate a second monent at the loop header; and
         program instructions to generate a second monexit at the loop exit, wherein the plurality of successive iterations of the first monent-monexit pairs remain unmodified inside the loop body.

* * * * *